Patented Sept. 15, 1931

1,823,097

UNITED STATES PATENT OFFICE

WORTHINGTON T. GRACE, OF WILLOUGHBY, OHIO, ASSIGNOR TO THE GRASSELLI CHEMICAL COMPANY, OF CLEVELAND, OHIO, A CORPORATION OF DELAWARE

PROCESS OF PURIFYING TECHNICAL AMMONIUM CHLORIDE LIQUORS

No Drawing. Application filed June 20, 1929. Serial No. 372,539.

Ammonium chloride crystals are commonly produced by concentrating and crystallizing liquors obtained from aqua ammonia and technical hydrochloric acid. While ammonia is available nowadays in reasonably pure form, the technical hydrochloric acid is commonly contaminated with metal salts particularly of iron and aluminum and these precipitate together with the ammonium chloride during crystallization. Iron salts are particularly objectionable as they discolor the finished product and moreover seem to interfere with the formation of large, so-called dogteeth crystals which is a form in which ammonium chloride is extensively used.

I have now found that by adding oxy compounds of lead to ammonium chloride liquors containing iron and other undesirable heavy metal salts, these latter are precipitated and my invention comprises the purification of technical ammonium chloride liquors by the addition of oxy compounds of lead thereto.

Lead oxide, PbO, added to technical ammonium chloride liquors precipitates iron salts slowly out of liquors containing a small excess of ammonia, and at a concentration of 9 to 12° Bé.

The action of red lead, $Pb_3O_4$, is much more rapid and the sediment settles in a short time in a readily separable form.

The ammonium chloride liquors intended for the production of large crystals are usually concentrated to between 9 and 13° Bé. at boiling temperature, these liquors are then allowed to cool to room temperature in a week to ten days time.

I add to such liquors before cooling an amount of lead oxide, litharge or red lead coresponding to about 0.4 to 0.6% of the weight of liquor. These lead compounds are soluble in the hot liquors and when red lead has been added a heavy precipitate forms and settles out in a few hours, leaving a clear supernatant liquor which is decanted or siphoned off without entrainment of or contamination with the precipitate. On cooling such clear, decanted liquor large ammonium chloride crystals separate slowly. These crystals are in the most desirable shape and have the requisite hardness for use in tinning, fluxing, etc. operations.

The amount of oxy compounds of lead to be added to ammonium chloride liquors depends to a certain extent upon the iron and other heavy metal salt content of the liquor; the figures given above correspond to liquors obtained by neutralizing pure, commercial aqua ammonia with ordinary, yellow colored, technical hydrochloric acid. It is preferable to use an excess of lead compound over that which is equivalent to the salt content of the liquor. This excess produces an alkaline condition in the liquor which is desirable, though it could also be produced by an addition of ammonia. The best results have been obtained when the alkalinity of the concentrated liquor corresponds to about 0.10% free ammonia on the weight of the liquor.

It is also possible to add the oxy compound of lead to the ammonium chloride liquor before concentration and separating the precipitate at any time before crystallization, but in this instance the correct alkalinity has to be restored before the liquor is allowed to cool.

I claim:

1. The process of removing impurities such as iron compounds from ammonium chloride liquors which comprises adding an oxy compound of lead to said liquors and separating the clear liquors from the precipitate formed.

2. The process of removing impurities such as iron compounds from ammonium chloride liquors which comprises adding red lead to said liquors and separating the liquors from the precipitate formed.

3. The process of removing impurities such as iron compounds from ammonium chloride liquors which comprises adding to said liquors an amount of red lead slightly in excess of that required to precipitate said impurities, and separating the liquors from the precipitate formed.

4. The process of removing impurities such as iron compounds from ammonium chloride liquors, which comprises adding to said liquors while they contain a small amount of free ammonia, a small amount of an oxy compound of lead and separating the liquors from the precipitate formed.

5. The process of removing impurities such as iron compounds from ammonium chloride liquors, which comprises adding to said liquors while they contain a small amount of free ammonia, a small amount of red lead and separating the liquors from the precipitate formed.

In testimony whereof, I affix my signature.

WORTHINGTON T. GRACE.